United States Patent [19]

Dedole et al.

[11] Patent Number: 4,648,478
[45] Date of Patent: Mar. 10, 1987

[54] DEVICE FOR GENERATING SOUND PULSES INSIDE A WELL, BY PERCUSSION

[75] Inventors: Pascal Dedole, Rueil-Malmaison; Pierre Grolet, Orgerus; Jean Laurent, Orgeval, all of France

[73] Assignee: Institut Francais du Petrol, Rueil-Malmaison, France

[21] Appl. No.: 694,053

[22] Filed: Jan. 23, 1985

[30] Foreign Application Priority Data

Jan. 23, 1984 [FR] France ................. 84 01094

[51] Int. Cl.$^4$ .................. G01V 1/00; G01V 1/04; G01V 1/40
[52] U.S. Cl. ..................... 181/106; 181/119; 367/25; 367/143; 367/911
[58] Field of Search ............... 166/212; 181/102, 103, 181/104, 105, 106, 113, 119, 120, 139, 142; 367/25, 35, 75, 86, 143, 191, 911, 912; 73/151

[56] References Cited

U.S. PATENT DOCUMENTS

| | | | |
|---|---|---|---|
| 3,209,854 | 10/1965 | Williams | 181/121 |
| 3,408,622 | 10/1968 | Cox | 367/48 |
| 3,777,814 | 12/1973 | Gustavson et al. | 73/151 X |
| 3,858,167 | 12/1974 | Stas et al. | 367/75 |
| 3,990,297 | 9/1975 | Pelet et al. | 73/152 |
| 4,394,754 | 7/1983 | Waters | 367/75 |

FOREIGN PATENT DOCUMENTS

| | | | |
|---|---|---|---|
| 2272455 | 12/1975 | France. | |
| 2436403 | 4/1980 | France. | |
| 2442455 | 6/1980 | France. | |
| 8401094 | 1/1984 | France. | |
| 688885 | 10/1979 | U.S.S.R. | 181/102 |
| 1141357 | 2/1985 | U.S.S.R. | 181/119 |

Primary Examiner—Charles T. Jordan
Assistant Examiner—Brian S. Steinberger
Attorney, Agent, or Firm—Antonelli, Terry & Wands

[57] ABSTRACT

A device for generating sound pulses in a well by a mobile mass striking against a target element integral with an elongate body anchored in a well by retractable shoes actuated by hydraulic cylinders. The mobile mass which slides in a first chamber in the body is moved away by a piston moving in a second chamber of the body and intermittently locked in the moved away position by a valve. The piston, the valve and also the hydraulic cylinders acting on the anchorage shoes are actuated by a hydraulic system which may be remote controlled from the surface.

9 Claims, 12 Drawing Figures

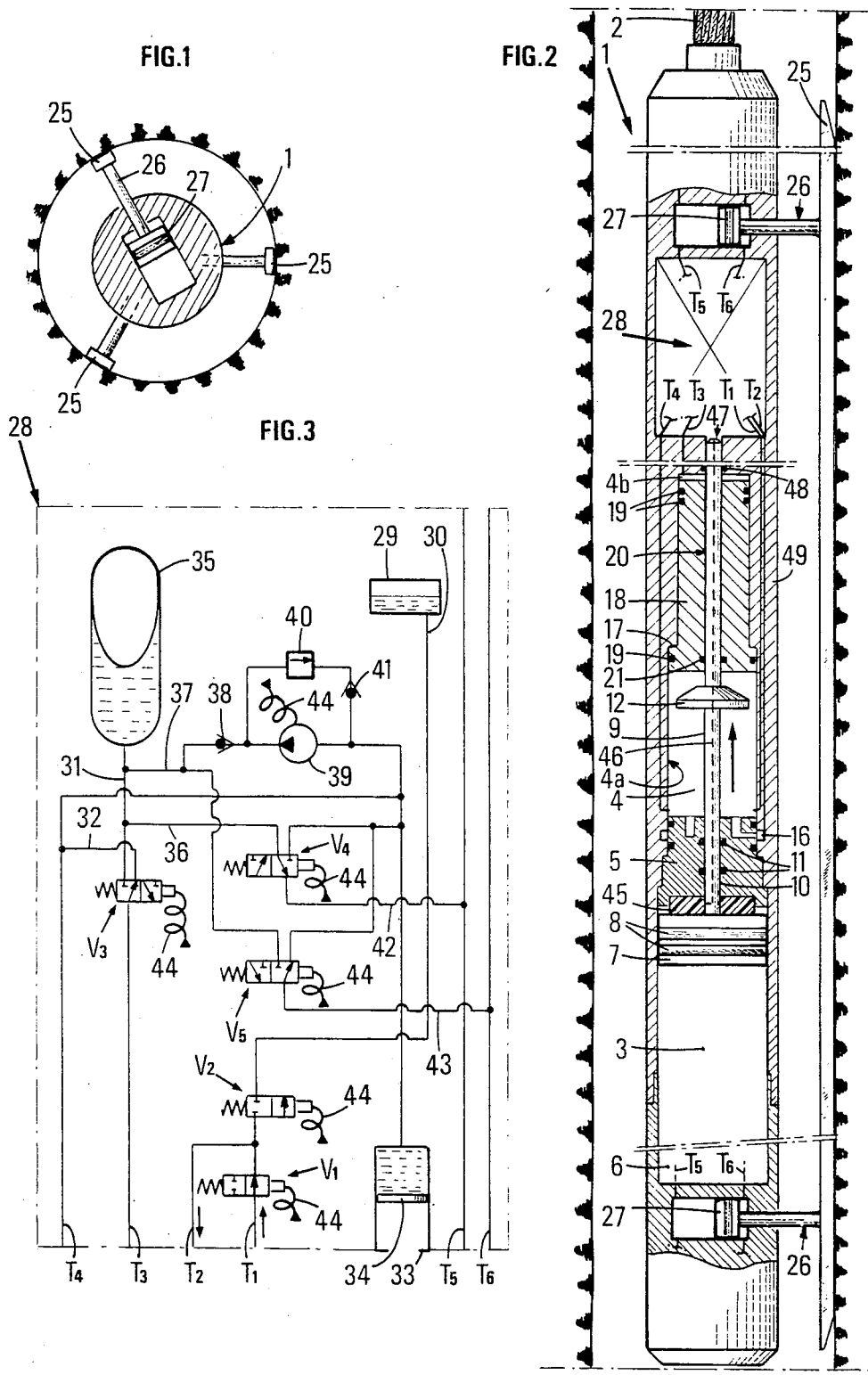

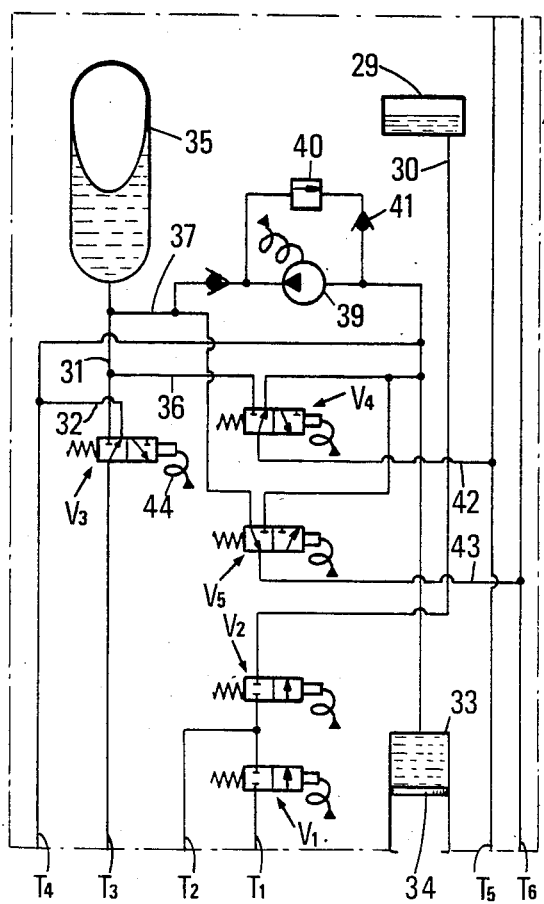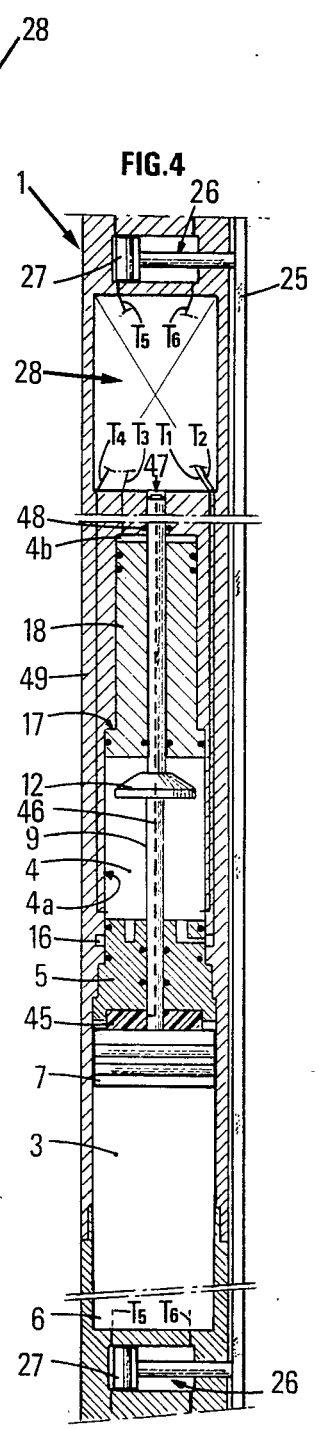

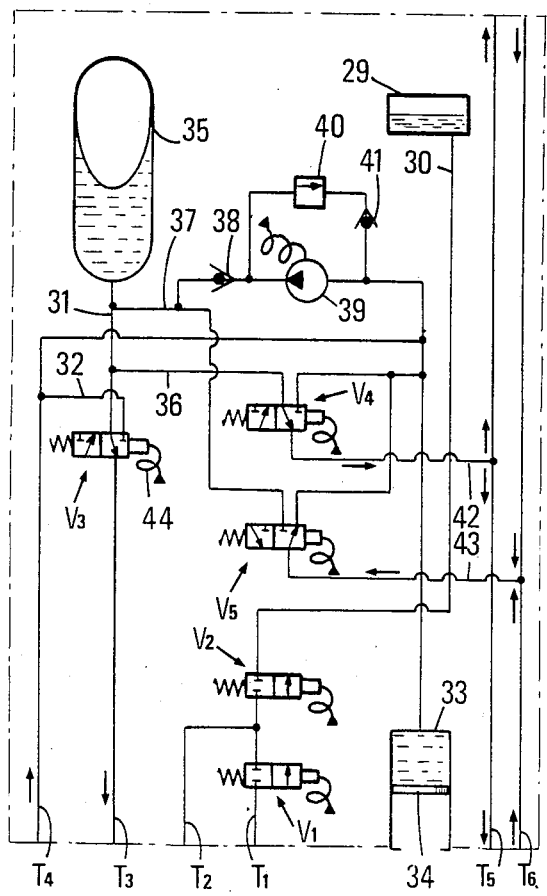
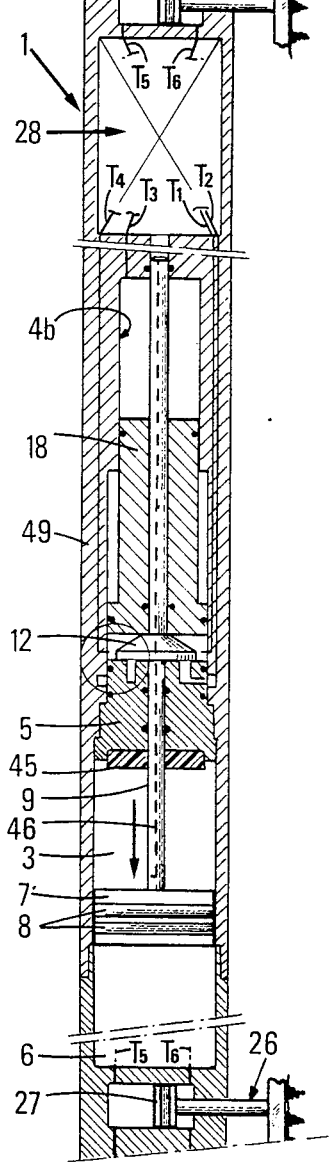
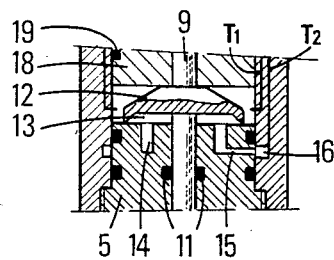

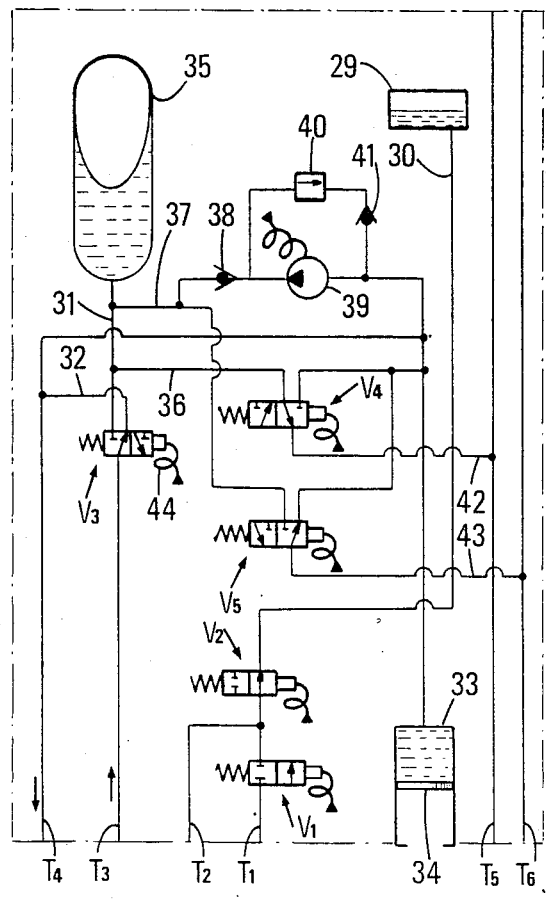
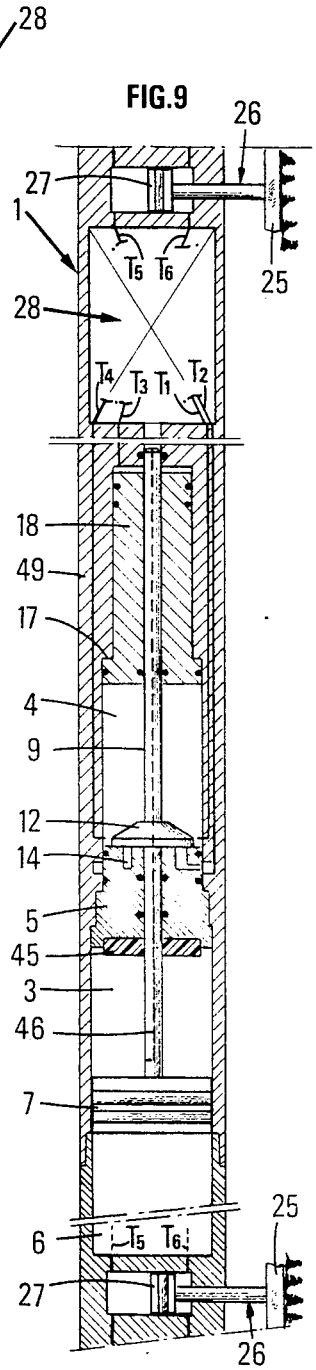

FIG.11
FIG.12
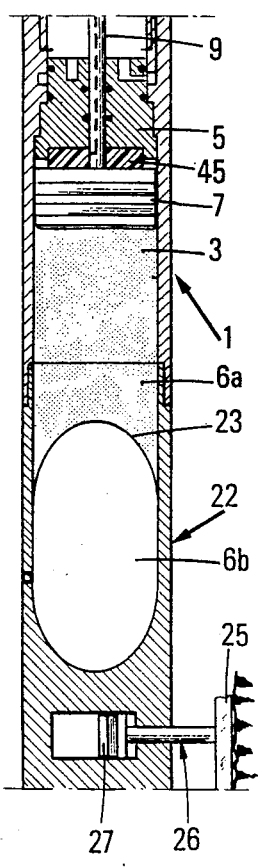
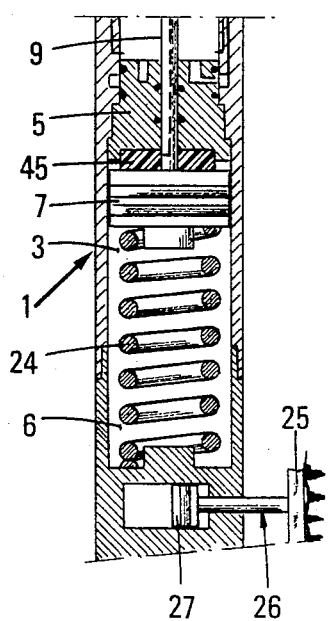

DEVICE FOR GENERATING SOUND PULSES INSIDE A WELL, BY PERCUSSION

BACKGROUND OF THE INVENTION

1. Field of the Invention

The present invention relates to a device for generating percussion sound pulses inside a well or a cavity and more particularly an emitting device adapted to be lowered to a certain depth in a well drilled in the ground, for generating sound pulses which may be used for carrying out seismic prospection operations for example.

A well pulse source has a certain number of advantages. By using such a source seismic prospection operations may be carried out from well to well which allows a high power of resolution to be obtained or else oblique seismic profiles to be rapidly plotted by picking up the emitted waves using a plulrality of receivers disposed on the surface.

It is furthermore more efficient than a source disposed on the surface. An appreciable part of the sound energy produced thereby is in fact emitted in the form of unusable surface waves or Rayleigh waves and the part of this energy which is emitted in the form of P or S type waves is considerably attenuated by the surface layer or altered layer (W.Z). The P or S wave energy yield of a well source emitting under the altered layer is therefore much higher.

2. Description of the Prior Art

Among well sources of a known type may be mentioned those which use solid explosives or explosive gas mixtures. Such sources produce very powerful seismic pulses but the frequency spectrum of these pulses comprises an appreciable part of high frequencies which have no practical interest in the field of seismic prospection. The power of the explosions generally results in damaging the well or impairing the neighboring regions, to such an extent that subsequent repetition of the seismic shots fired at the same places is difficult. Explosive sources are described for example in U.S. Pat. Nos. 3,408,622, 3,858,176.

Sources of the airgun type may also be mentioned in which seismic pulses are generated by sudden gas discharges inside the well filled with water. Such sources produce powerful sound waves but for operation thereof require the use of a compressor or compressed fluid reservoirs which, because of the reduced space of the drilled hole, must be installed at the surface and connected to the source by piping. Such a source is described for example in French Pat. No. 2 311 322.

A known device for generating sound pulses by percussion inside a drill hole comprises a cylindrical body provided with anchorage spikes actuated by hydraulic systems. The means for producing shocks are formed by two weights associated with coils which move with respect to each other and collide under the action of the electromagnetic forces generated in the coils by controlled electric currents. Such a device, which is described in French Pat. No. 2 442 455, is suitable for producing relatively weak transverse seismic pulses and thus is not suited for seismic prospection operations where the depth of the ground to be explored is generally very great.

SUMMARY OF THE INVENTION

The device of the invention comprises a rigid elongate body having a section less than that of the well and is connected by a cable to a surface installation, the rigid body comprising two coaxial chambers isolated from each other by a fixed intermediate piece, a first one of the two chambers comprising an opening at its end opposite the intermediate piece, a mobile mass adapted for sealingly sliding inside the first chamber between a first position towards the open end thereof and a second position towards the opposite end, the mobile mass being integral with a valve adapted for movement in the second chamber and to come into bearing relation against a seat formed in the intermediate piece, in the first position of the mobile mass, a piston adapted for sealingly sliding inside the second chamber on the side of the valve opposite the intermediate piece and whose stroke is greater than that of the mobile mass between its first and second positions.

The device is characterized in that it comprises a cavity isolated from the environnement outside the rigid body and communicating with a first chamber through the opening therein, this cavity comprising resilient means for exerting on the mobile mass a driving force independent of the static pressure reigning in the well, and means for immobilizing the body in the well comprising at least one longitudinal shoe movable between a retracted position along the body and a spread out position for coupling with the wall of the well, under the action of at least one hydraulic jack, and a hydraulic system for controlling both the movement of the mobile mass towards its first position, for intermittently holding it in its first position and for operating the hydraulic jack.

Because of the elongate structure of the body and the arrangement thereof, a sufficiently large cavity is available for housing therein resilient means adapted for applying a great driving force on the mobile mass, which may thus have a large volume and stroke so as to obtain a high kinetic energy and consequently very powerful seismic pulses at the moments of the impacts.

BRIEF DESCRIPTION OF THE DRAWINGS

Other features and advantages of the device will be clear from reading the following description of non limitative embodiments with reference to the accompanying drawings in which:

FIG. 1 shows a cross sectional view of the body of the device held in a central position in the axis of a well by three anchoring shoes in the extended position;

FIG. 2 shows a partial schematical view in longitudinal section of the device, in the anchorage position, only one of the anchoring shoes being shown and the mobile mass having been tripped and having come back to its second position to strike a wall integral with the body;

FIG. 3 shows schematically the part of the hydraulic operating system disposed inside a compartment of the body, during the tripping phase of the device shown in FIG. 2, FIG. 4 shows a schematical partial view in longitudinal section of the device in the rest position, a single anchorage shoe being shown in the retracted position;

FIG. 5 shows schematically the hydraulic operating system in its compartment in the rest position of the device;

FIG. 6 shows a partial schematical view in longitudinal section of the device during the cocking or arming phase, the mobile mass used as striking mass having been brought into its first position (position in which it has moved away from the target element), by sliding of the piston;

FIG. 7 shows a partial enlarged view of the valve for temporarily locking the mobile mass in the cocked position;

FIG. 8 shows schematically the hydraulic operating system during the cocking phase;

FIG. 9 shows a partial schematical view in longitudinal section of the device, at the end of the cocking phase when, with the mobile mass held in its first position (moved away position) by locking the valve, the piston is brought back to its rest position;

FIG. 10 shows schematically the hydraulic operating system during the phase for locking the valve and returning the operating piston to its rest position;

FIG. 11 shows schematically a first embodiment of the means for applying a driving force to the mobile mass for impelling it towards the target element;

FIG. 12 shows schematically a second embodiment of the means for applying a driving force to the mobile mass.

DESCRIPTION OF THE PREFERRED EMBODIMENTS

Referring to FIGS. 1 to 10, it can be seen that the device of the invention comprises a hollow elongate rigid body 1 adapted for lowering, from the surface of the ground, into a drilled well or subterranean cavity, at the lower end of a support cable 2 comprising electric supply and signal transmission cables. The rigid body comprises two coaxial chambers 3, 4 isolated from each other by an inserted separation piece 5 fixed to the wall 49 of the body and whose face turned towards chamber 3 is used as impact wall. Chamber 3 communicates with a closed cavity 6 containing the means for applying the driving force (shown in FIGS. 11 and 12).

A mobile mass 7, having seals 8 at its periphery, is adapted for sliding in the first chamber 3. A rod 9 of a length greater than that of the two chambers 3, 4, is disposed along the axis of the body and passes through the separation piece 5 through an opening 10 formed therein. Seals 11 are disposed in the opening 10 about rod 9 for sealingly isolating the two chambers 3, 4 from each other. At the end of the second chamber 4 opposite the separation piece 5, rod 9 slides in a central bore 47 in body 1. Seals 48 are disposed in this bore so as to seal the sliding of the rod and isolate from chamber 4 the part of said bore above the end of the rod. Rod 9 has a central passage way 46 for communicating the part of chamber 3 between the mobile mass 7 and separation piece 5 with the central bore 47, which communicates with a cavity in the body containing air at atmospheric pressure as will be described further on.

Rod 9 is fixed in the first chamber 3 to the mobile mass 7 and in the second chamber 4 to a valve 12. When the valve is in contact with the separation piece 5, the mobile mass 7 is in its first position or spaced apart position.

A recess 13 (FIG. 7) is formed in the face of valve 12 turned towards the separation piece 5 and an annular cavity 14 having a diameter less than that of valve 12 is formed in said piece 5. A radial duct 15 places it in communication with a groove 16 in the inner wall of the body. The face of the separation piece 5 forms a seat for the valve 12.

A second chamber 4 comprises a first part 4a in which valve 12 moves and a second part 4b having a smaller cross section than that of the first one.

These two parts are separated by a shoulder 17 on the wall. The stroke and cross section of valve 12 are respectively less than the length and cross section of this first chamber part 4a.

An operating piston 18 comprising two parts with cross sections respectively equal to the inner cross sections of the two parts 4a and 4b of the second chamber and having annular seals 19 at its periphery is adapted for sealing sliding in the second chamber 4 between a rest position or retracted position in which it is driven into the second part 4b of the second chamber (FIG. 2 for example) and an extended position (FIG. 6 for example) in which it is in contact with the valve 12 when this latter is resting on its seat against the separation piece 5. The stroke of the operating piston 18 is greater than that of the mobile mass 7 and of valve 12 so that, when it is in its rest or retracted position, said mass may come freely into its second position or close up position in contact with the striking wall of the separation piece 5.

The operating piston 18 comprises a central bore 20 and circular seals 21, for sealing sliding of rod 9 associated with the mobile mass 7.

In a first embodiment shown in FIG. 11, the means for applying a driving force to the mobile mass 7 are formed by an eleo-pneumatic accumulator 22 of a known type disposed in cavity 6 which is then formed of two chambers 6a, 6b separated by a deformable wall 23. Chamber 6a communicates with chamber 3 and contains a liquid whose pressure is exerted on the mobile mass 7, the other 6b contains a pressurized gas. The pressure of the gas inside the accumulator 22 may be modified at will before the device is lowered into the well, so as to vary the drive force which will be applied to the mobile mass.

In a second embodiment shown in FIG. 12, cavities 3 and 6 communicate directly with one another and the means for applying a driving force to the mobile mass 7 comprise a spring 24 bearing at one end against said mobile mass and, at its other end, against the bottom of cavity 6.

The device preferably comprises (FIGS. 1 and 2) three longitudinal shoes 25 disposed around the periphery of body 1 of the device, at 120° from each other. Each shoe is fixed to the rods of two hydraulic jacks 26 disposed radially inside body 1 in the opposite endmost parts thereof, and may be moved from a retracted position in contact with the body (FIG. 4) to a position coupling with the wall of the well (FIG. 2 for example), by operating the pair of associated hydraulic jacks 26.

The hydraulic system for controlling the movement of the mobile mass 7 towards its first position (cocked position), for holding it intermittently up to the moment when it is tripped and for controlling the hydraulic jacks associated with the different shoes, is disposed in a compartment 28 in the body.

This system comprises first of all (FIG. 2 for example) a group of four ducts T1, T2, T3, T4 parallel to the axis of body 1, which are formed in the outer wall thereof.

Ducts T1, T2 open at a first end respectively in the vicinity of the base of the second chamber 4 (in its part 4a) and into the circular groove 16 in the wall of body 1. Ducts T3, T4 open at a first end respectively in the vicinity of the two opposite ends of the second chamber 4. It also comprises a duct T5 interconnecting in parallel relation the ends of the cylindrical cavities of the six hydraulic jacks, on the same side of the piston 27 of said hydraulic jacks and a duct T6 interconnecting in parallel relation the opposite parts of these same cavities, between pistons 27 and shoes 25.

Ducts T1 and T6 extend to compartment 28 where they are connected to drive means shown in detail in FIGS. 3, 5, 8, 10.

Duct T2 is connected at its other end to one channel of two electromagnetic valves V1, V2 having two channels closed in the rest position, the other two channels thereof being connected respectively to duct T1 and to a reservoir 29 containing a gas at a pressure very much less than the pressure reigning outside the body, under normal conditions of use of the device, air at atmospheric pressure for example, by means of the duct 30.

Duct T3 comunicates with a channel of a three channel electromagnetic valve V3, the other two channels being connected respectively one to a duct 31, the other to a duct 32 opening into duct T4. This latter is connected to one end of a cylinder 33 for compensating the static pressure, communicating at its opposite end with the outside of the body 1, and in which a piston 34 slides freely. Thus, the hydraulic fluid in duct T4 and consequently at the base of chamber 4 is kept at a pressure equal to the external hydrostatic pressure. An oleopneumatic accumulator 35 of a known type supplies with pressurized oil duct 31 and two ducts 36, 37 connected respectively to one channel of two three channel electromagnetic valves V4, V5. Accumulator 35 is charged to a pressure greater than the pressure outside body 1 through a non return valve 38, by means of a hydraulic pump 39 driven by an electric motor (not shown) and whose input is connected to duct T4. A circuit element comprising a valve 40 set to a given pressure and a non return valve 41 is disposed in parallel across pump 39 for limiting the over pressure generated by this latter in operation.

A second channel of each of the two electromagnetic valves V4, V5 is connected to duct T4. Their third respective channels are connected by ducts 42, 43 respectively to ducts T5 and T6 supplying the hydraulic cylinders 26.

The electromagnetic valves and the electric motor of the hydraulic pump 39 are connected electrically by conductors 44 connected to conductors of the multifunction cable 2, to a control assembly installed on the surface and not shown.

In the rest state, in the absence of electric power, the electromagnetic valves are in the position shown in FIG. 5, these positions being such that ducts T1 and T2 are isolated from each other, ducts T3 and T4 are both at the hydrostatic pressure and ducts T5 and T6 are respectively at the same pressure as that reigning in the well and at the pressure of the accumulator 35.

The device operates in the following way:

With the electromagnetic valves in the rest position (FIG. 5), duct T6 is at the pressure of the oleo-pneumatic accumulator 35, which maintains shoes 25 in the retracted position in contact with the body 1 (FIG. 4), and the same pressure is exerted on both sides of the operating piston 18. Since the area of this latter is greater on part 4a side of chamber 4 than on the opposite side, the force resulting from the application of this pressure on its opposite faces results in maintaining it in a high position (driven in position). Furthermore, the driving force applied to the mobile mass 7 from the cavity 6 side results in maintaining it in its second position in contact with the impact wall of the separation piece 5. The pressure which is established in compartments 28 and 29 is for example that of air at atmospheric pressure.

The device is lowered from the surface to a chosen position or brought to this position from a preceding position and anchored in the well. For this (FIG. 8), the electromagnetic valves V4 and V5 are actuated simultaneously so as to place ducts T5 and T6 respectively in communication with the oleo-pneumatic accumulator 35 and with its static balancing cylinder 33 in which a lower pressure reigns, and pistons 27 of the hydraulic cylinders 26, under the action of the pressure difference, push shoes 25 to their extended position in contact with the walls of the well. Then the electromagnetic valve V3 is actuated so as to place duct T3 in communication with duct 31. The pressurized liquid in this duct is applied on the part 4b side of chamber 4 to the operating piston 18 which moves downwardly and comes into contact with the valve 12 driving it in translation until it comes in contact with the separation piece 5 (FIG. 6) and until recess 13 of said valve (FIG. 7) is isolated from the rest of the second chamber 4. The mobile mass 7 then occupies its low position (first position).

Then (FIGS. 9, 10) the electromagnetic valve V2 is opened and recess 13 of valve 12 is placed in communication with the atmospheric pressure reservoir 29, through the annular recess 14 in the separation piece 5 and ducts T2 and 30. The cross section of the valve 12 is chosen so that the pressure difference between the external pressure and the atmospheric pressure exerted on each side is sufficient for holding it in contact with the separation element, in the absence of any thrust from the operating piston 18. Then piston 7 is caused to rise by actuating the electromagnetic valve V3 so as to place ducts T3 and T4 in communication with each other. Since the two opposite faces of said piston are at the same pressure and since they have unequal areas, this piston returns to its driven in position (top position).

The cycle is finished by tripping the device. For this, electromagnetic valve V2 is closed and electromagnetic valve V1 (FIG. 3) is opened, so as to equalize the pressures on each side of the valve 12, which removes any retaining force. The mobile mass 7 impelled by the drive means contained in cavity 6 (FIGS. 11, 12) comes suddenly back to its rest position (FIG. 2) where it strikes the impact wall of separation piece 5. Under the shock, seismic pulses are emitted and are transferred to the walls of the well through the anchorage shoes 25.

A disk 45, made from a deformable material may be fixed to the impact wall of the separation piece 5 so as to avoid damage thereof under the effect of repeated shocks.

Still within the scope of the invention, a single anchorage shoe may be used, the body then being offcentered and in direct contact with the wall of the well of each shoe may be replaced by two separate shoes disposed at the levels of the endmost parts of the body and actuated separately by drive means.

What is claimed is:

1. A device for generating sound waves in a well, by a mass striking a target element mechanically coupled to a wall of the well, the device comprising a rigid elongate body having a cross section less than a cross-section of the well and connected by a cable to a surface installation, said rigid body comprising two coaxial chambers isolated from each other by a fixed intermediate piece, a first one of the two chambers comprising an opening at an end opposite the intermediate piece, a mobile mass adapted for sealingly sliding inside the first chamber between a first position towards the end thereof having said opening and a second position in contact with said intermediate piece, said mobile mass being integral with a valve adapted for moving in said second chamber and for coming to bear against a seat formed in the intermediate piece, in the first position of said mobile mass, an operating piston adapted for sealingly sliding inside said second chamber, on a side of the valve opposite said intermediate piece and having a stroke greater than a stroke of said mobile mass between first and second positions thereof, said device further comprising a cavity isolated from the environment outside the rigid body and communicating with the first chamber through said opening, said cavity comprising means for exerting on the mobile mass a drive force independent of a static pressure existing in the well, and means for immobilizing said body in the well comprising at least one longitudinal shoe extending parallel to the body, said shoe being movable between a retracted position along said body and a spread out position coupled with the wall of the well, under an action of at least one hydraulic jack, a hydraulic system comprising a plurality of switching means controlled by said cable and motor means supplied through said cable for providing both movement of the mobile mass toward its first position, intermittent maintenance thereof in its first position and operation of said hydraulic jack.

2. The device as claimed in claim 1, wherein said valve comprises an inner recess, said second chamber comprises two parts with unequal cross sections, said operating piston comprises two parts with different cross sections adapted respectively to the cross sections of the two parts of said second chamber, an end of the piston having a larger cross section being adapted to come into abutment against the valve and to drive the valve in translation, and wherein said hydraulic system comprises a pressure source, ducts associated with first switching means of said plurality of switching means for placing the end of a part of said second chamber having a smaller cross section in communication with one of said pressure source and the opposite part of the same chamber, ducts associated with second switching means of said plurality of switching means for placing said inner recess of the valve in communication with one of an inside of said second chamber and a reservoir containing a fluid at a pressure less than a pressure in said second chamber, when said valve is engaged on a valve seat, and ducts associated with third switching means of said plurality of switching means for placing each opposite endmost parts of the body of said hydraulic jack intermittently in communication with said pressure source.

3. The device as claimed in claim 2, wherein said pressure means comprise at least one hydraulic pump adapted for compressing a fluid whose pressure is held balanced with the pressure reigning outside the body by a pressure balancing circuit comprising a balancing cylinder communicating at one of its ends with the outside of the body in which a free piston moves.

4. The device as claimed in claim 3, wherein said first and third switching means are formed by electromagnetic valves connected hydraulically in parallel between the output of the hydraulic pump and said pressure balancing circuit and wherein said second switching means are formed by two electromagnetic valves interconnected in series, the circuit which connects them together being connected to the inner recess of said valve, and inserted in a circuit connecting said reservoir and said second chamber together.

5. The device as claimed in claim 3, wherein said hydraulic pump is coupled to an oleo-pneumatic accumulator.

6. The device as claimed in claim 1, further comprising three longitudinal shoes disposed at 120° with respect to each other, each of said shoes being movable by two hydraulic jacks disposed radially in endmost parts of the body, the two hydraulic jacks being connected in parallel by ducts connected to said third switching means.

7. The device as claimed in claim 1, wherein said means for exerting a drive force on said mobile mass comprise an oleo-pneumatic accumulator.

8. The device as claimed in claim 1, wherein said means for exerting a drive force on said mobile mass comprise a spring compressed inside said cavity by the recoil of said mobile mass to the first position.

9. The device as claimed in claim 1, wherein a layer of a deformable material is fixed to said intermediate piece for absorbing the impacts thereagainst of the mobile mass in the second position.

* * * * *